United States Patent [19]
Schwandt et al.

[11] Patent Number: 5,858,224
[45] Date of Patent: Jan. 12, 1999

[54] FILTER WITH PRESSURE SENSOR MOUNTED IN HOUSING END

[75] Inventors: Brian W. Schwandt, Fort Atkinson; Barry M. Verdegan; Brian K. Wagner, both of Stoughton; Christopher E. Holm, Madison, all of Wis.

[73] Assignee: Nelson Industries, Inc., Stoughton, Wis.

[21] Appl. No.: 819,296

[22] Filed: Mar. 18, 1997

[51] Int. Cl.⁶ .................................................. B01D 35/143
[52] U.S. Cl. ........................... 210/90; 210/171; 210/411; 210/443; 96/421; 73/756
[58] Field of Search .............................. 210/90, 108, 130, 210/171, 440, 443, 446, DIG. 17, 323.1, 409, 411; 123/196 A; 93/421; 73/756

[56] References Cited

U.S. PATENT DOCUMENTS

| | | |
|---|---|---|
| 3,044,475 | 7/1962 | Thompson ...................... 210/DIG. 17 |
| 3,495,566 | 2/1970 | Pall ............................................ 210/90 |
| 3,547,069 | 12/1970 | Tao ........................................... 210/90 |
| 3,591,003 | 7/1971 | Cooper .................................... 210/130 |
| 3,646,906 | 3/1972 | Hammer .................................... 210/90 |
| 4,783,256 | 11/1988 | Cooper et al. ............................ 210/90 |
| 5,462,679 | 10/1995 | Verdegan et al. ...................... 210/798 |
| 5,702,592 | 12/1997 | Suri et al. ................................. 210/90 |
| 5,718,822 | 2/1998 | Richter ..................................... 210/90 |

FOREIGN PATENT DOCUMENTS

| | | | |
|---|---|---|---|
| 565428 | 3/1979 | U.S.S.R. .................................. 210/90 |

OTHER PUBLICATIONS

"Rosedale Hydraulic T–Filters for Suction and Return Lines" brochure, Rosedale Products, Inc., Box 1085, Ann Arbor, MI 48106, admitted prior art at least as early as 1995.

"Hycon Clogging Indicators: Mechanical—Electrical—Electronic", Catalog A 7.050.3/Dec. 1986, Hycon Corporation, P.O. Box 22110, Lehigh Valley, PA 18002–2110.

"Filter Head Mounted Element Change Indicator With Electrical Output", admitted prior art at least as early as 1995.

"Visual, Filter Head Mounted Element Change Indicator A", admitted prior art at least as early as 1995.

"Visual, Filter Head Mounted Element Change Indicator B", admitted prior art at least as early as 1995.

"Element Change Indicator With Electrical Output Mounted On Bottom of Filter", admitted prior art at least as early as 1995.

*Primary Examiner*—Joseph W. Drodge
*Attorney, Agent, or Firm*—Andrus, Sceales, Starke & Sawall

[57] ABSTRACT

A fluid filter (10) includes a housing (14), a mounting head (16), a filter element (34), and a pressure sensor (54) mounted to the housing (14) and having a high pressure port (58) communicating with the high pressure side (36) of the filter element (34) and having a low pressure port (60) communicating with the low pressure side (38) of the filter element (34) to sense the pressure drop across the filter element.

17 Claims, 3 Drawing Sheets

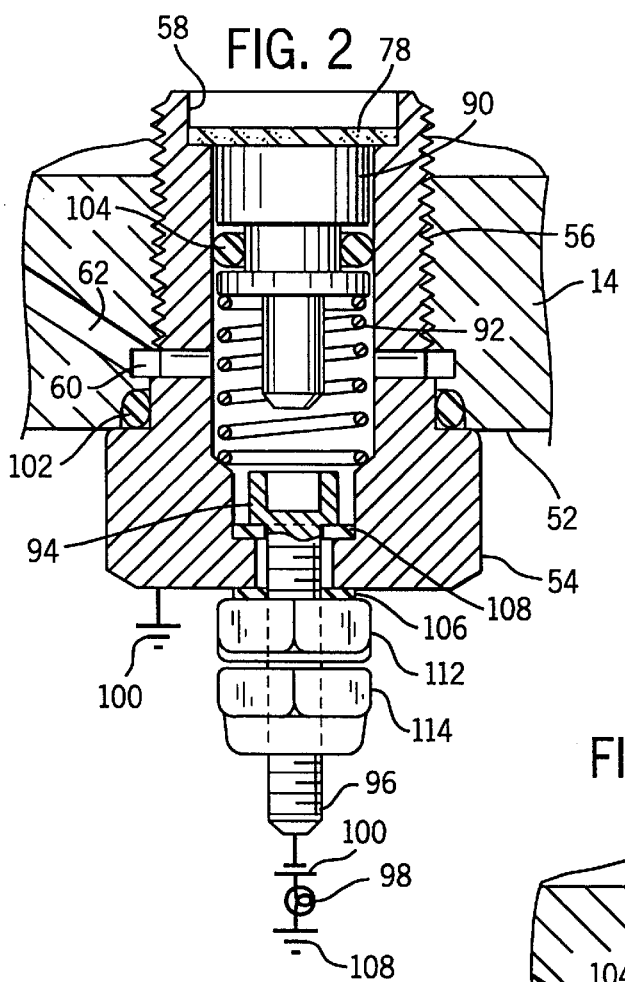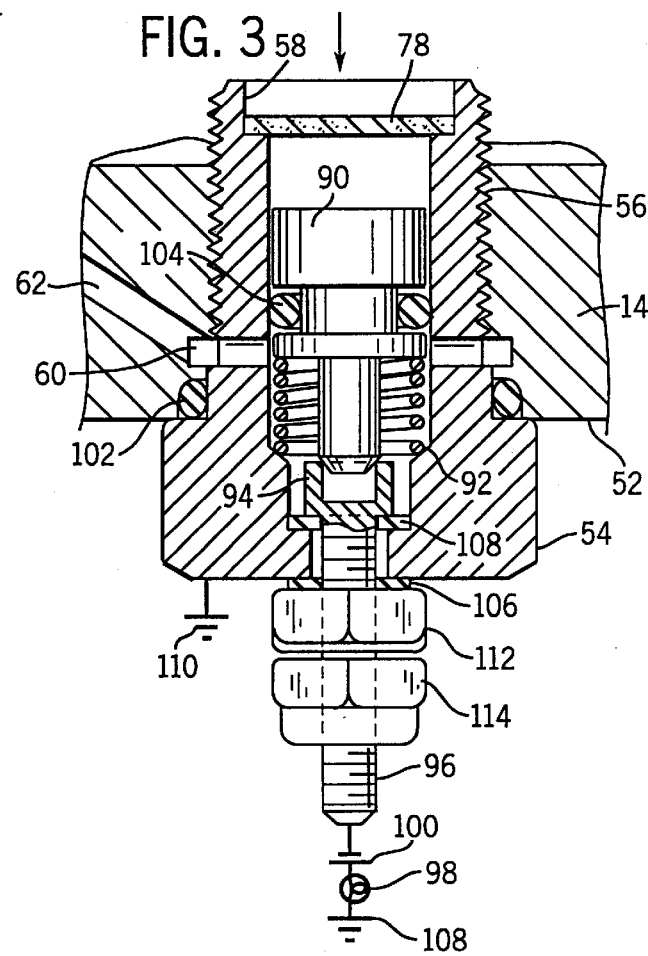

FILTER WITH PRESSURE SENSOR MOUNTED IN HOUSING END

BACKGROUND AND SUMMARY

The invention relates to fluid filters for filtering fluid from a machine, including spin-on type oil filters for internal combustion engines and hydraulic equipment, and more particularly to a filter with an indicator indicating when it is time to clean or replace the filter.

Filters are used on equipment and engines to reduce operating costs by slowing down component wear. As filters remove particles from lubricating fluid, the pressure drop across the filter element or media increases, and, if left unattended, the filter plugs. The increased pressure drop reduces the flow of fluid to the equipment or engine. Depending on the type of filter, this can result in increased wear rates, decreased fuel efficiency, and catastrophic failure. Further, particle removal efficiency typically declines as the pressure drop rises. Thus, filters need to be cleaned or changed before plugging becomes significant. Typically, filters are serviced, i.e. cleaned or replaced, at regular intervals of time or distance.

Commonly owned U.S. Pat. No. 5,462,679, incorporated herein by reference, discloses an in-situ cleanable oil filter that can be reused over and over again. Nonetheless, cleaning becomes less efficient over time, and the filter may gradually become too restrictive for use. Due to variability in operating conditions, it is impossible to predict in advance when plugging will occur. As a result, users must replace filter elements earlier than necessary, or alternatively after they have plugged. In the former case, users pay the cost of unnecessary filter replacement. In the latter case, accelerated equipment wear occurs, and maintenance costs can be higher. Therefore, it is desirable to have a device that indicates the optimal time to replace the filter media element. For cleanable filters, such as in the '679 patent, the optimal time for media element replacement is when the pressure drop across the media element exceeds a certain critical level. Typically, this occurs at a lower pressure than the terminal pressure drop of disposable elements, and lower than the pressure drop required to activate the filter bypass valve in engine oil and hydraulic oil systems. Unlike disposable filters, the cleanable filter is still removing particles, and its restriction is not excessive when this level is reached, but subsequent cleaning may not allow the filter to be used for an entire filter service interval.

For conventional disposable filters, the media element must be replaced when the pressure drop becomes excessive. At this point, particle removal efficiency is reduced and continued usage will only result in further reductions in removal efficiency and equipment protection. Furthermore, the restriction is such that either the equipment's filter bypass valve will open (and particle removal will be drastically reduced), or the flow through the filter and to oil lubricated components will decrease. Thus, the filter must be replaced at this time. Although filter media elements are typically changed at regular intervals, it is desirable to have an indicator to tell operators to replace the filter under unusual conditions.

The present invention was developed for use, in the preferred embodiment, with in-situ cleanable filters, though the invention can be used with either cleanable or disposable filters to determine when the filter media element needs to be replaced. Devices using pressure change, i.e. $\Delta P$, sensors of various types are known in the prior art and indicate the need for disposable filter element replacement. Typically, such sensors are incorporated into the filter mounting head for spin-on type filters and become a permanent part of the equipment. For some freestanding cartridge type filters, such $\Delta P$ sensors are mounted onto the housing with oil lines connecting sampling points upstream and downstream of the element to a gauge or sensor. Some cartridge type filters with canister or bowl style housings have centrally mounted devices utilizing multiple components, fittings and connectors to indicate pressure drop.

In the present invention, in the preferred embodiment, the sampling line and sampling points are integral parts of the bottom of the filter housing, which also has a mounting port for the sensor fitting. For in-situ cleanable filters, in one embodiment, the port and fitting are radially offset from the center of the housing in order to avoid interference with the function of the air inlet cleansing port of the filter used for backflushing. For disposable filters, such port and fitting can be either radially offset or centered with respect to the bottom of the housing. The internal end of such port allows the sensor access to the high pressure side of the filter media element for in-situ cleanable filters. For disposable filters, it can provide access to either the low or high pressure side. A channel drilled into the housing connects the mounting port to the low pressure side of the media element for in-situ cleanable filters. For disposable filters, it can provide access to either the high or low pressure side as needed to measure $\Delta P$.

In the preferred embodiment, the $\Delta P$ sensor is mounted in a single hydraulic type fitting that threads directly into the bottom end of the housing. The $\Delta P$ sensor is preferably a movable piston, though other types may be used, such as piezoresistive type. The high pressure end of the fitting is equipped with a porous media, such as sintered metal, to dampen the effects of pressure surges on the sensor. This reduces the incidence of false indications of element plugging that may result from cold starts or changing flow rates. The porous media is also a filter, protecting the $\Delta P$ sensor and preventing dirty fluid from reaching the clean side of the main filter, and preventing hydraulic lock of the $\Delta P$ sensor when a piston type is used, because there is no film formation between the piston and a plate or the like with a hole therethrough. A connector located at the other end of the fitting allows the electrical output from the sensor to be connected to a DC power supply, such as a battery, and an appropriate display or monitor device, such as a dashboard mounted light, or to the equipment's electronic control module. The electrical connector provides for easy removal of the attached wires during filter element changes and installation. Either the sensor itself or the display/monitor device are set such that excessive pressure drop alerts the user that the filter element needs to be changed.

An advantage of the invention is that it can be used with either in-situ cleanable filters or conventional disposable filters. For cleanable filters, the invention has an advantage over alternatives in that in the preferred embodiment it is located radially offcenter and does not interfere with the operation of the air inlet cleansing port. Further for cleanable filters, the invention provides early warning of the need to replace the media element. Users may respond by cleaning the element more frequently until the element is replaced without fear of damaging their equipment. The invention reduces the number of components required for installation relative to other designs because it is located at the bottom of the permanent filter housing, instead of the filter mounting head, and allows easy installation onto existing filter heads, for example when used in conjunction with filters and filter housings such as shown in commonly owned U.S. application Ser. Nos. 08/755,479, filed Nov. 22, 1996, and 08/755,497, filed Nov. 22, 1996, now U.S. Pat. No. 5,779,900, incorporated herein by reference. Since most components are contained within either the housing or the fitting, they are better protected than alternative systems. Further, problems associated with wiring and fittings damaged by use are minimized, whether the filter is cleanable or disposable. This also facilitates installation by either the end user or the factory. To the end user, the invention has an advantage in that filter life can be determined directly and accurately for both cleanable and disposable filters.

BRIEF DESCRIPTION OF THE DRAWINGS

FIG. 2 is a sectional view partly in elevation of a portion of the structure of FIG. 1.

FIG. 3 is a view like FIG. 2 and shows another operational condition.

DETAILED DESCRIPTION

Figure 1:
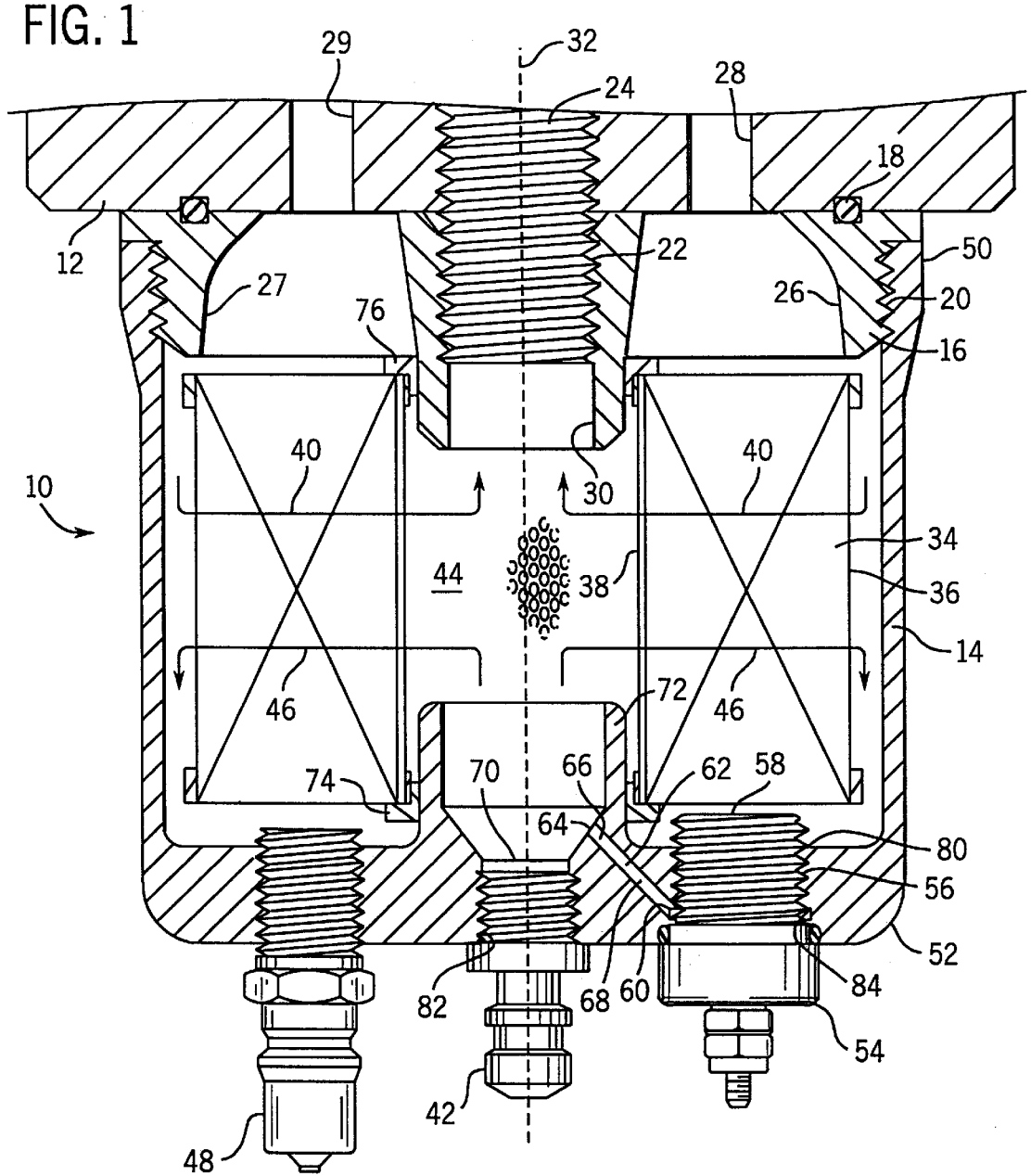
FIG. 1 is a sectional view partly in elevation of a filter in accordance with the invention.
Figure 4:
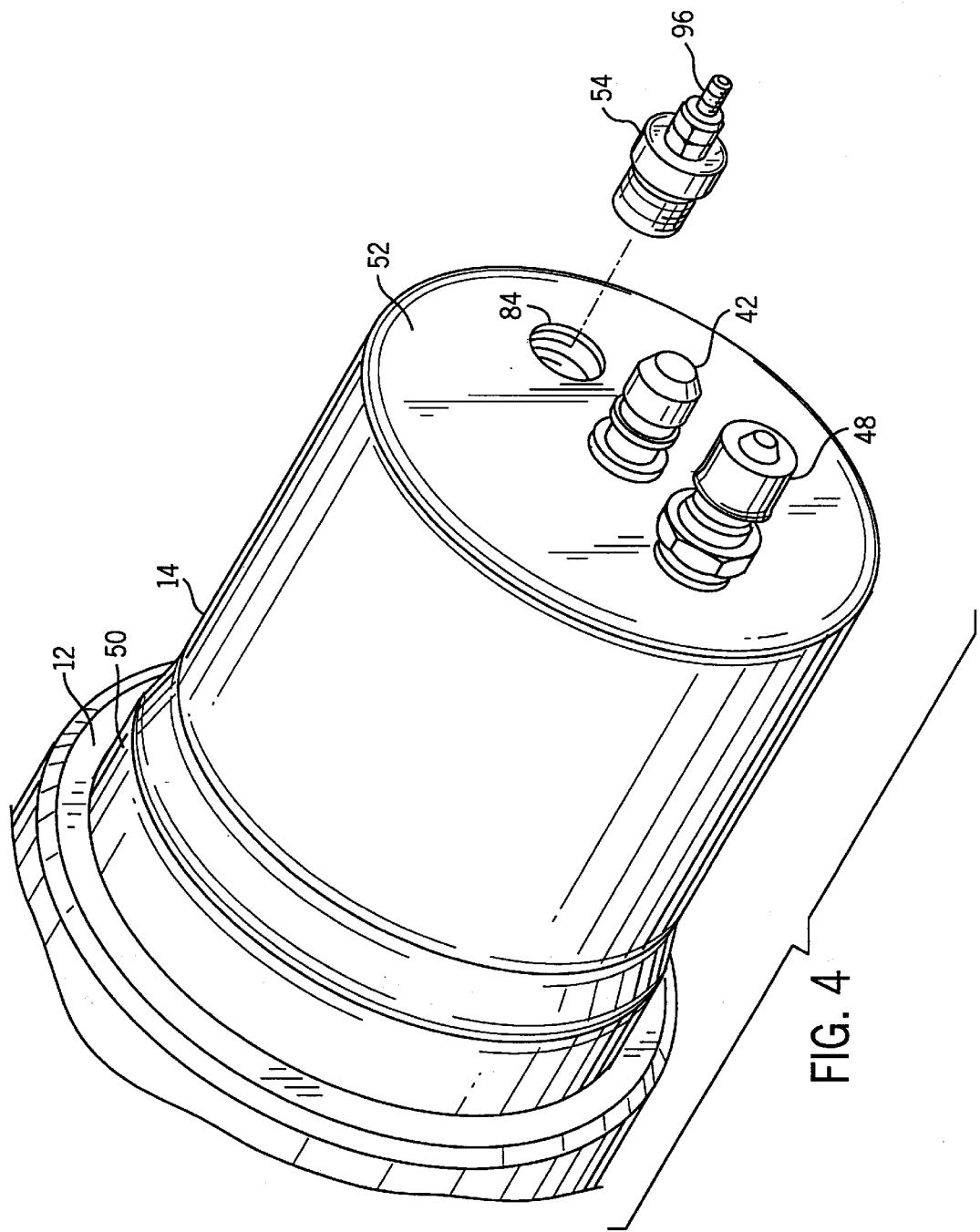
FIG. 4 is an exploded perspective view of the structure of FIG. 1.

FIG. 1 shows a fluid filter 10 for filtering fluid from a machine, such as an internal combustion engine for example as shown at engine block 12. The filter includes a housing 14, and a mounting head 16 mounting the housing to the machine and sealed thereto at annular O-ring gasket 18. In the embodiment shown, housing 14 is threaded to mounting head 16 at threads 20, and mounting head 16 is mounted to engine block 12 at threads 22 on central hollow mounting stud 24 extending from the engine block. Mounting head 16 has a plurality of high pressure inlets circumferentially surrounding mounting stud 24, two of which is shown at 26 and 27, communicating with a respective high pressure discharge outlet such as 28 and 29 from the machine 12, providing a high pressure inlet from the machine into housing 14. Mounting head 16 has a low pressure outlet 30 from the housing back into the machine through hollow stud 24 along axial centerline 32.

An annular filter media element 34 in housing 14 has a high pressure side 36 communicating with high pressure inlets 26, 27, and has a low pressure side 38 communicating with low pressure outlet 30. Filter element 34 is a standard pleated element having an inner perforated metal cylindrical member at low pressure side 38. Fluid flows from high pressure inlets 26, 27 into housing 14 then radially inwardly from high pressure side 36 to low pressure side 38 as shown at directional arrow 40, then axially upwardly into low pressure outlet 30 along axial centerline 32.

In the embodiment in FIG. 1, a cleansing fluid inlet fitting 42 is provided in the bottom end of the housing for introducing cleansing fluid such as air into the hollow interior 44 of annular filter element 34 for backflushing the filter element media along directional arrow 46, for example as disclosed in the above noted and incorporated patent and applications. Fitting 42 is along axial centerline 32. A cleansing fluid outlet drain fitting 48 in the bottom end of the housing is radially offset from fitting 42 and axial centerline 32. Cleansing fluid outlet drain fitting 48 communicates with the high pressure side 36 of filter element 34 for discharging the cleansing fluid backflushing the filter element from low pressure side 38 along directional arrow 46 to high pressure side 36.

Housing 14 is a generally cylindrical member extending axially along axis 32 between distally opposite ends 50 and 52. Mounting head 16 is at end 50. A pressure sensor 54 is at end 52. Pressure sensor 54 is mounted to the housing at threads 56 and has a high pressure port 58 communicating with high pressure side 36 of filter element 34, and a low pressure port 60 communicating with low pressure side 38 of filter element 34 to sense the pressure drop across filter element 34. Low pressure outlet 30 of mounting head 16 is generally along the axial centerline 32 of cylindrical housing 14, and high pressure inlet 26 is radially offset from low pressure outlet 30. One of the noted ports of the pressure sensor, preferably high pressure port 58, is generally axially aligned with one of the high pressure inlet and the low pressure outlet of mounting head 16, preferably high pressure inlet 26. Housing 14 has a channel 62 therethrough from the other of the noted ports, preferably low pressure port 60, to an opening 64 generally axially aligned with the other of the high pressure inlet and the low pressure outlet of mounting head 16, preferably low pressure outlet 30. Annular filter element 34 has the noted hollow interior 44 axially aligned with low pressure outlet 30 and one of the channel opening and the low pressure port, preferably channel opening 64. The annulus of annular member 34 contains filtering media, such as pleated synthetic fibrous material, which is axially aligned with and interposed between high pressure inlet 26 and one of the high pressure port and the channel opening, preferably high pressure port 58.

Channel 62 extends through housing 14 along a direction including a radial component relative to axis 32, and has a first end 66 at the noted opening 64, and a second end 68 at one of the noted ports, preferably low pressure port 60. The direction along which channel 62 extends through housing 14 includes an axial component such that channel 62 extends from end 68 radially toward opening 64 and axially toward mounting head 16.

In the preferred embodiment as shown in FIG. 1, pressure sensor 54 is axially aligned with high pressure inlet 26 and the filtering media in the annulus of filter element 34, and is radially offset from axial centerline 32. End 68 of channel 62 is at low pressure port 60. Channel 62 extends from end 68 radially inwardly toward centerline 32 to end 66 at opening 64 axially aligned with low pressure outlet 30 and the hollow interior 44 of the annulus of filter element 34. The direction along which channel 62 extends includes the noted radial axial components such that channel 62 extends from end 68 radially inwardly toward centerline 32 and axially toward mounting head 16.

As above noted, cleansing fluid inlet fitting 42 in bottom end 52 of housing 14 is provided for introducing cleansing fluid such as air into hollow interior 44 of the annulus of filter element 34 at entry point 70 adjacent channel opening 64 at end 66 of channel 62. Bottom end 52 of housing 14 has an internal boss 72 extending axially into housing 14 and engaging annular filter element 34 in sealing relation at gasket 74 to separate high and low pressure sides 36 and 38 of filter element 34. Channel 62 extends through boss 72. The upper end of annular filter element 34 is likewise sealed at annular gasket 76 to mounting head 16.

A surge suppressor 78, FIGS. 2 and 3, is provided at high pressure port 58 to dampen the effects of pressure surges from the high pressure inlets 26, 27. In the preferred embodiment, surge suppressor 78 is a porous media element, preferably sintered metal. Porous media element 78 is also a filter, protecting pressure sensor 54 against contamination from dirty fluid in housing 14 from reaching the clean side 38 of filter element 34 through the pressure sensor. Porous media filter element 78 also prevents hydraulic lock when a piston type pressure sensor is used because there is no film formation between piston 90 and a plate or the like having a hole therethrough.

Bottom end 52 of housing 14 has a first opening 80, FIG. 1, communicating with high pressure side 36 of filter element 34, and a second opening 82 communicating with low pressure side 38 of filter element 34. Pressure sensor 54 has high and low pressure ports 58 and 60 communicating respectively with first and second openings 80 and 82 of housing 14 to sense the pressure drop across filter element 14. Bottom end 52 of housing 14 has a mounting opening 84 receiving pressure sensor 54. Mounting opening 84 is in communication with each of openings 80 and 82. In the embodiment shown in FIG. 1, low pressure outlet 30 is generally along the axial centerline 32 of axially extending cylindrical housing 14. High pressure inlet 26 is radially offset from low pressure outlet 30. Filter element 34 is an annular member having a hollow interior 44 axially aligned with low pressure outlet 30. The annulus of annular filter member 34 contains filtering media, and mounting opening 84 is generally axially aligned with one of openings 80 and 82 and is radially offset from the other of such openings. Preferably, mounting opening 84 is generally axially aligned with opening 80 and is radially offset from opening 82.

As noted above, various types of pressure sensors may be used. Pressure sensor 54, FIGS. 2 and 3, may be a plunger type wherein plunger 90 moves downwardly in response to higher pressure from high pressure side 36 of filter element 34, compressing spring 92 until the plunger engages cup-shaped member 94, FIG. 3, of electrode 96 to complete a circuit to ground to illuminate warning light 98 or other indicator as energized by DC or other electromotive potential source 100. O-rings 102 and 104 provide sealing, and electrically insulative washers 106 and 108 provide electrical insulation and sealing. The circuit is completed from DC source 100 through indicator 98 through ground 108 back through ground 110 which may be the engine block, back through filter housing 14 at bottom end 52 and/or sensor housing 54 as grounded through the engine block, through spring 92 as contacting sensor 54. Nut 112 mounts electrode 96 to the sensor, and nut 114 facilitates attachment of electrical connection wires from source 100 to electrode 96 between nuts 112 and 114. Various other types of sensors and indicator circuitry and systems may be used.

It is recognized that various equivalents, alternatives and modifications are possible within the scope of the append claims.

We claim:

1. A fluid filter for filtering fluid from a machine, comprising a generally cylindrical housing extending axially between distally opposite ends, a mounting head at one of said ends of said housing and mounting said housing to said machine and having a high pressure inlet from said machine into said housing and having a low pressure outlet from said housing back into said machine, a filter element in said housing and having a high pressure side communicating with said high pressure inlet and having a low pressure side communicating with said low pressure outlet, first and second openings in the other of said ends of said housing, said first opening communicating with said high pressure side of said filter element, said second opening communicating with said low pressure side of said filter element, a pressure sensor having high and low pressure ports communicating respectively with said first and second openings to sense the pressure drop across said filter element, said sensor being offset from said second opening.

2. The invention according to claim 1 wherein said pressure sensor is mounted to said other end of said housing.

3. The invention according to claim 2 wherein said other end of said housing has a mounting opening receiving said pressure sensor, and wherein said mounting opening is in communication with each of said first and second openings.

4. The invention according to claim 3 wherein said low pressure outlet is generally along the axial centerline of said axially extending cylindrical housing, said high pressure inlet is radially offset from said low pressure outlet, said filter element is an annular member having a hollow interior axially aligned with said low pressure outlet, the annulus of said annular member contains filtering media, said mounting opening is generally axially aligned with one of said first and second openings and is radially offset from the other of said first and second openings.

5. The invention according to claim 4 wherein said housing has a channel extending therethrough from said mounting opening to said other opening.

6. The invention according to claim 5 wherein the direction of extension of said channel includes both radial and axial components.

7. The invention according to claim 5 wherein said mounting opening, said first opening, said filtering media and said high pressure inlet are all generally axially aligned, and radially offset from said second opening.

8. The invention according to claim 5 wherein said channel has first and second ends, wherein said first end is at said other opening, and wherein said second end and said one opening meet at said mounting opening.

9. The invention according to claim 1 comprising a surge suppressor at said high pressure port damping the effects of pressure surges from said high pressure inlet.

10. The invention according to claim 9 wherein said surge suppressor comprises a porous media element.

11. The invention according to claim 10 wherein said porous media element comprises sintered metal.

12. The invention according to claim 11 comprising a filter at said high pressure port protecting said pressure sensor against contamination from dirty fluid in said housing.

13. The invention according to claim 1 comprising a combined surge suppressor and filter at said high pressure port damping the effects of pressure surges from said high pressure inlet and protecting said pressure sensor against contamination from dirty fluid in said housing.

14. A fluid filter for filtering fluid from a machine, comprising a generally cylindrical housing extending axially between distally opposite first and second axial ends, a mounting head at said first axial end of said housing and mounting said housing to said machine and having a high pressure inlet from said machine into said housing and having a low pressure outlet from said housing back into said machine, said high pressure inlet being radially outwardly offset from said low pressure outlet, an annular filter element in said housing and having a high pressure outer side communicating with said high pressure inlet and having a low pressure inner side communicating with said low pressure outlet, said annular filter element having a hollow interior axially aligned with said low pressure outlet along the axial centerline of said axially extending cylindrical housing, the annulus of said annular filter element containing filtering media, first and second openings in said second axial end of said housing and communicating respectively with said high and low pressure sides of said annular filter element, said first opening and said filtering media in said annulus of said annular filter element and said high pressure inlet of said mounting head all being axially aligned, said second opening being axially aligned with said hollow interior of said annular filter element and radially inwardly offset from said first opening, a pressure sensor mounted to said housing in said first opening at said second axial end of said housing such that said pressure sensor is axially aligned with said high pressure inlet of said mounting head and said filtering media in said annulus of said annular filter element and is radially outwardly offset from said second opening, said pressure sensor having high and low pressure ports communicating respectively with said first and second openings to sense pressure drop across said annular filter element.

15. The invention according to claim 14 wherein said housing has a channel therethrough extending from said second opening radially outwardly to said low pressure port to sense low pressure in said hollow interior of said annular filter element.

16. The invention according to claim 15 wherein said channel has a first end at said second opening and a second end axially aligned with said first opening.

17. The invention according to claim 16 comprising in combination a cleansing fluid inlet fitting in said second axial end of said housing along said axial centerline for introducing cleansing fluid into said hollow interior of said annular filter element at an entry point adjacent said second opening at said first end of said channel, and a cleansing fluid outlet drain fitting in said second axial end of said housing and radially outwardly offset from said axial centerline and communicating with said high pressure side of said annular filter element for discharging cleansing fluid backflushing said annular filter element from said low pressure side to said high pressure side.

* * * * *